United States Patent [19]

Baker

[11] Patent Number: 5,704,398
[45] Date of Patent: Jan. 6, 1998

US005704398A

[54] VALVE LINKAGE SYSTEM

[76] Inventor: William H. Baker, 30 Honeysuckle Woods, Clover, S.C. 29710

[21] Appl. No.: 610,049

[22] Filed: Mar. 4, 1996

[51] Int. Cl.$^6$ ............................................ F16K 11/16
[52] U.S. Cl. ..................... 137/862; 137/637; 137/637.1
[58] Field of Search .................... 137/862, 637, 137/637.1

[56] References Cited

U.S. PATENT DOCUMENTS

| | | | |
|---|---|---|---|
| 456,256 | 7/1891 | Fletcher | 137/862 X |
| 599,283 | 2/1898 | De Freitas | 137/637.1 X |
| 715,758 | 12/1902 | Cooper | 137/637.1 |
| 1,364,555 | 1/1921 | Hunt | 137/862 |
| 1,441,088 | 1/1923 | Hofstetter | 137/637.1 |
| 1,615,429 | 1/1927 | Woerruley | 137/862 X |
| 2,015,182 | 9/1935 | Hladih | 137/637.1 |
| 4,585,032 | 4/1986 | van Lingen | 137/862 |

OTHER PUBLICATIONS

Paddock Pool Equipment Company, Inc. Brochure, p. 10.

"Vacuum Sand Filter Compak Model VSC Vacu–Flo", Paddock Pool Equipment Company, Inc. Brochure.

"VSC Vacu–Flo Vacuum Sand Filter", Paddock Pool Equipment Company, Inc. Brochure (Mar. 1990).

*Primary Examiner*—John Fox
*Attorney, Agent, or Firm*—Kennedy Covington Lobdell & Hickman LLP

[57] ABSTRACT

A valve linkage comprises valve arrangements each comprising a valve disc disposed in its respective conduit, a valve shaft attached thereto and extending therefrom, and a lever arm attached to the shaft. In one preferred embodiment, certain valve arrangements have an actuating plate attached to their shaft with two adjustable actuating members selectively placeable thereon for selected actuation, and the lever arm is rotatably attached to the shaft adjacent the actuating plate and is further rotatable about the shaft between engagement with the two actuating members, the lever arm adjusts the valve when the lever arm is moved in engagement with an actuating member. A linking rod is pivotally attached to each lever arm of all valve arrangements, and a manually operated handle or a hydraulic cylinder is pivotably mounted to the linking assembly and is movable to simultaneously adjust actuated valve arrangements. In a second preferred embodiment, all valve arrangements have an identical valve disc and shaft to that described above, and lever arms of all valve arrangements are fixedly attached to and pivotable with the valve shafts. A linking assembly is pivotably attached to all lever arms, and is further slidably attached to lever arms of selected valve arrangements. Actuating members are selectively placeable on the linking assembly and engageable with the lever arms of the selected valve arrangements. During movement of the linking assembly, actuating members selectively engage the lever arms to actuate and adjust the selected valve arrangements while all other valve arrangements are adjusted.

20 Claims, 3 Drawing Sheets

VALVE LINKAGE SYSTEM

BACKGROUND OF THE INVENTION

The present invention relates to a valve arrangement for adjusting the flow rate in a fluid conduit, and more specifically, to a valve system having a valve linkage operated for selectively adjusting simultaneously the flow rates in two or more fluid conduits.

The present invention has various applications. One such application is the use of the present invention in sand filtration systems used with swimming pools. In a typical sand filtration system there are two cycles: a filter cycle and a backwash cycle. In the filter cycle, pool water enters a filter tank from a top header in a filter chamber and is forced through filter sand and a supporting rock bed, then out of the tank through a lateral underdrain system, and returned to the pool. In the backwash cycle, the filter medium is cleansed by forcing water into the bottom of the tank via the lateral underdrain system, forcing it up through the rock bed where the filter sand expands causing scrubbing action to take place, and forcing the water out of the top header with dirt particles flushed from the sand. The pool water is used in both cycles by diverting the direction of flow from the pool to either the top header or the lateral underdrain system. Water exiting the filter chamber from the lateral underdrain system is directed back to the pool, and water exiting the filter chamber through the top header is directed to a waste disposal system. Two valves control the flow of the pool water to the filtration system, a first valve controlling the flow of water to the top header and a second valve controlling the flow of water to the lateral underdrain system. A third valve controls the flow of water to the waste disposal system from the top header and a fourth valve controls the flow of water to the pool from the lateral underdrain system. Thus, four valves control the two cycles of the filtration system: the filter cycle is performed when the first and fourth valves are open and the second and third valves are closed; and the backwash cycle is performed when the second and third valves are open and the first and fourth valves are closed.

Conventionally, the valves are manually operated one-at-a-time. For instance, to change from the filter cycle to the backwash cycle, the operator closes the first and fourth valves and then opens the second and third valves. Manual operation of each valve is beneficial because each valve may need to be independently operated to different positions to control the flow of the water therethrough. There exist circumstances where the flow through a particular valve may need to be limited, as for example, in a waste disposal system which may not have the capacity to handle a full open position by the third valve. There also exist circumstances where the rate of change of flow of a valve may be of concern, as for example, in the backwashing cycle, where the opening of the fourth valve may need to be done in a slow manner so as to allow the backwash pressure to build in the filter chamber, rather than quickly unleashing the backwash into the filter chamber thereby causing a turbulent burst of water through the rock bed.

There thus is a need for efficient operation of the valves of a filtration system in changing from a filtration cycle to a backwash cycle, and then back again. The present invention accomplishes efficient operation of the valves while addressing the concerns described above relating to independent valve adjustment.

SUMMARY OF THE INVENTION

The present invention provides a valve arrangement for adjusting the flow rate in a fluid conduit which includes a valve in the conduit for adjusting the flow rate of the fluid therethrough, an actuator associated with the valve for actuation of the valve, and a controller attached to the valve for controlling actuation and adjustment of the valve. The actuator includes two actuating members with which the controller is engageable for actuation and adjustment of the valve when the controller moves while in engagement with one of the actuating members; the actuating members are positioned, and preferably selectively positionable, so that the controller is disposed in-between the two actuating members. In one preferred embodiment of the present invention, the controller is movable between the two actuating members, and in a particular displacement of the controller, the valve is adjusted when the controller moves into and while in engagement with an actuating member. No adjustment occurs, however, when the controller moves out of engagement with an actuating member. In a second preferred embodiment of the present invention, the actuating members are displaceable with respect to the controller and the valve is adjusted when the controller moves while in engagement with an actuating member. Similarly, no adjustment occurs when the actuating members move while out of engagement with the controller.

More specifically, the valve of both preferred embodiments of the present invention comprises a valve disc disposed in the conduit and rotatable therein and a valve shaft attached to the disc and extending therefrom outside of the conduit. The valve disc and valve shaft are rotatable between one position in which the flow in the conduit is blocked and another position in which the flow in the conduit is open, and all positions therebetween in which the flow is partially blocked to varying degrees. In a first preferred embodiment, the valve arrangement includes an actuating plate attached to the valve as the actuator, with two pegs comprising the actuating members and a lever arm comprising the controller. The actuating plate is fixedly attached to the shaft and the aforesaid two adjustable pegs are selectively placeable on the actuating plate to vary the arcuate distance therebetween. The lever arm is rotatably attached to the shaft adjacent the actuating plate, and further is rotatable about the shaft between one position, in which the lever arm engages a first peg, and another position, in which the lever arm engages a second peg. Selected actuation of the valve occurs when the lever arm is moved while in engagement with one of the actuating pegs; movement of the lever arm while in engagement with an actuating peg causes rotational motion of the shaft and the disc, thereby adjusting the flow rate through the valve. When the lever arm rotates between and out of engagement with a peg, however, selected actuation of the valve ceases, i.e., no rotational motion of the shaft results, the position of the valve disc does not change, and the flow rate through the valve and conduit remains unchanged. Selected actuation is adjusted by selected placement of the actuating members on the actuating plate.

In the second embodiment, as previously mentioned, the valve disc and valve shaft are identical to that of the first preferred embodiment described above. In the second preferred embodiment, however, the controller includes the lever arm of the first embodiment, but the lever arm is fixedly attached to the valve shaft. An elongated rod is slidably attached to the lever arm, and the actuator includes two actuating members disposable on the rod to be slidably displaceable with respect to the lever arm and engageable therewith, so that when an actuating member engages and moves in engagement with the lever arm, the lever arm moves and adjusts the valve shaft and valve disc. Selected actuation is adjusted by selected placement of the actuating members on the rod.

The aforesaid valve arrangements of the present invention may be used to adjust the flow rates in two or more fluid conduits by disposing a valve arrangement in each conduit and providing a valve linkage that includes a linking bar, rod or other linking assembly that connects the controller of each valve arrangement together. The linking bar includes a manually operated handle or a mechanical device, such as a hydraulic or pneumatic cylinder and the like, which pivotably connects to the linking bar. When the handle or mechanical device moves, it causes the linking bar to move, thereby leading to engagement between a controller and an actuating member of each valve, thereby affecting selected actuation and adjustment of each valve.

In the first preferred embodiment, the linking assembly is pivotably connected to the controller of each valve arrangement. In the second preferred embodiment, the linking assembly is slidably and pivotably connected to the controller of each valve arrangement, and the actuator of each valve arrangement includes two actuating members disposed on the linking assembly.

DETAILED DESCRIPTION OF THE PREFERRED EMBODIMENT

Figure 1:
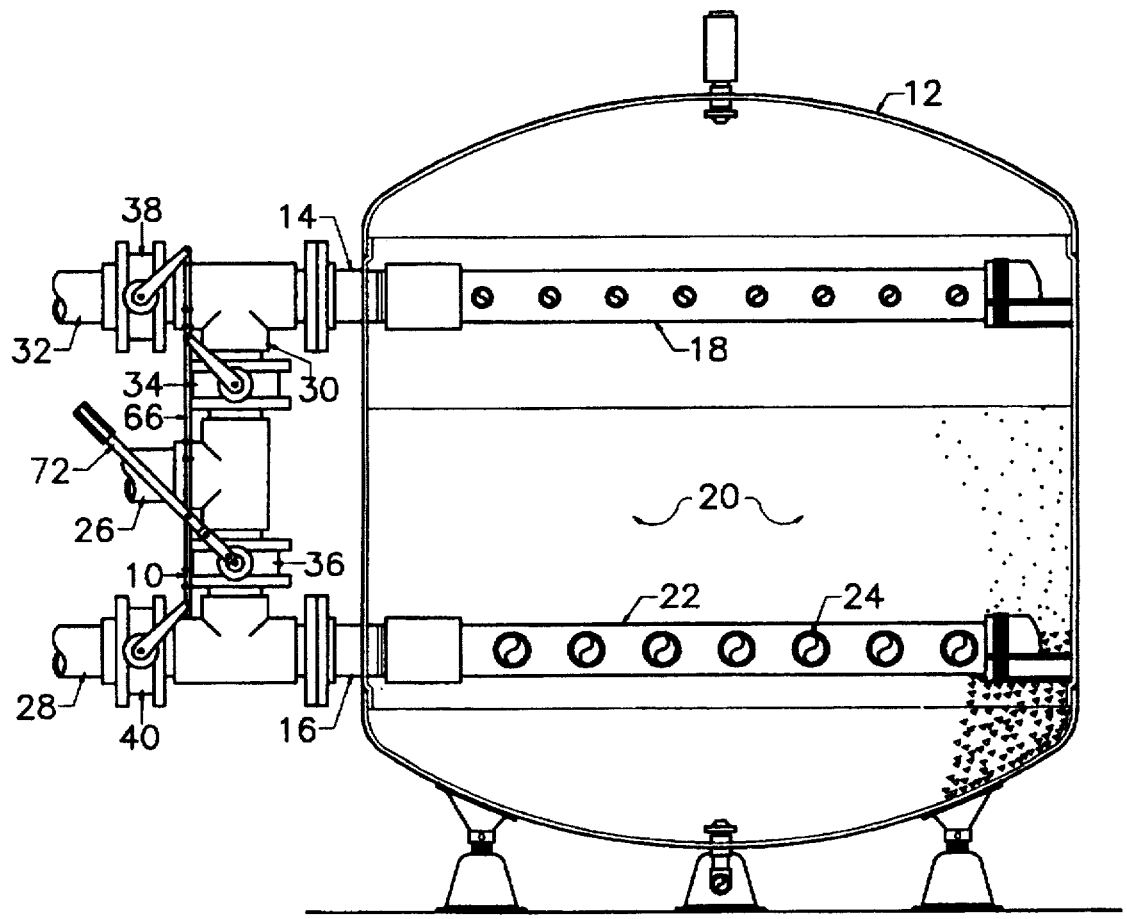
FIG. 1 illustrates a preferred valve linkage system of the present invention in use with a typical sand filtration system for a swimming pool.
Figure 2:
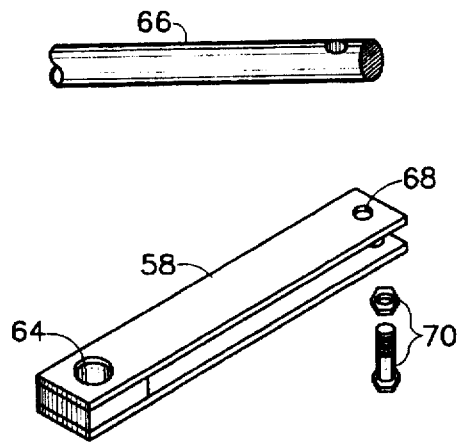
FIG. 2 illustrates a valve, actuator, and controller of the valve arrangement of the present invention.
Figure 2:
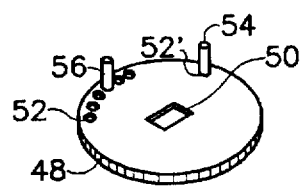
Figure 2:
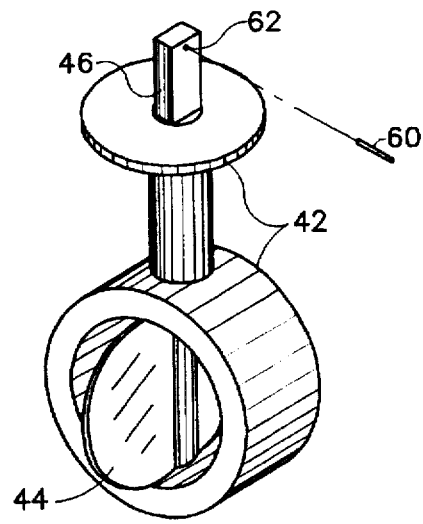
Figure 3:
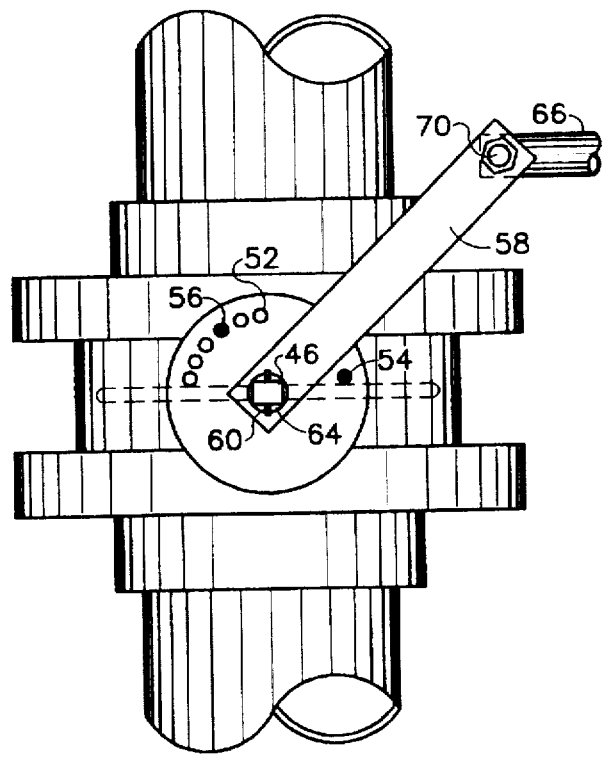
FIG. 3 illustrates a valve arrangement of FIG. 2 in the closed position blocking fluid flow through the conduit.
Figure 4:
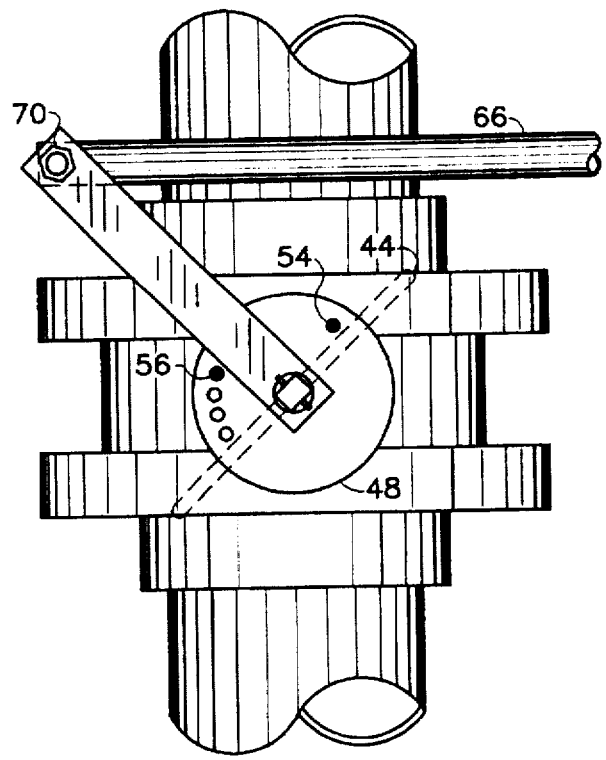
FIG. 4 illustrates a valve arrangement of FIG. 3 in a partially opened condition.

The preferred embodiments of the present invention will now be described in detail with reference to FIGS. 1–7.

Referring to the preferred embodiment illustrated in FIGS. 1–4, FIG. 1 shows the preferred embodiment of the valve linkage system 10 of the present invention used in a typical sand filtration system for a swimming pool which includes a sand filtration tank 12 having a filtration inflow conduit 14 and a filtration outflow conduit 16. The filtration tank 12 also includes a top header 18 in the filtration tank 12 through which water from the filtration inflow conduit 14 enters the tank 12. A filtration medium 20 is provided within the tank and comprises mostly sand with a rock bed, and an underdrain system 22, comprising a drain 24 and the filtration outflow conduit 16, extends beneath the filtration medium 20. It is contemplated that more than one filtration tank 12 can be employed in utilizing the preferred embodiment illustrated in FIG. 1 by branching the conduits; however, for clarity of illustration, only one filtration tank is shown in FIGS. 1–4.

Pool water is delivered to the filtration system by way of a pool conduit 26 and returned to the pool via a pool conduit 28. The pool conduit 26 and pool conduit 28 communicate with a bridge conduit 30 that connects together the filtration inflow conduit 14 and filtration outflow conduit 16. A water disposal conduit 32 also communicates with the bridge conduit 30 and serves to remove and dispose of waste water from the backwash cycle.

Four identical valve arrangements 34,36,38,40 are employed in the preferred valve system illustrated in FIG. 1 in order to control the water flow through the above described conduits. Valves 34,36 control the flow of water from a swimming pool through conduit 26 to the filtration tank 12, with valve 34 being disposed in conduit 30 and interposed between conduit 26 and conduit 14 to control the flow of water to the filtration tank 12 through conduit 14 and top header 18, and with valve 36 being disposed in conduit 30 and interposed between conduit 26 and conduit 16 to control the flow of water to the underdrain system 22 of the tank 12 through conduit 16. Valves 38,40 control the flow of the water from the filtration tank 12, with valve 38 being located in conduit 32 to control the flow of the water to a disposal system (not shown) and with valve 40 being located in conduit 28 to control the flow of water back to the pool.

Each valve arrangement 34,36,38,40 comprises a valve having an annular valve body 42 in which a circular valve disc 44 is disposed, with valve disc 44 and a portion of valve body 42 being disposed within the conduit. Valve disc 44 is rotatable between a first position in which valve disc 44 extends across the valve body 42 to block fluid flow in the conduit (see FIG. 3), and a second open position in which the valve disc 44 is disposed in a plane parallel to the axis of the valve body 42 to permit full flow of the water through the conduit, and all positions therebetween in which the flow is partially blocked to varying degrees (see, e.g., FIG. 4). The valve arrangement further comprises a rotatable valve shaft 46 that is attached to disc 44 and extends therefrom through the valve body 42 to present an end portion having a rectangular configuration, and rotation of shaft 46 causes disc 44 to rotate between the aforesaid first and second positions and to all positions therebetween.

A circular actuating plate 48 is fixedly attached to the rectangular end of shaft 46 by way of rectangular slot 50, and has two adjustable actuating members in the form of pegs 54,56 that are selectively placeable in holes 52 formed in actuating plate 48 to vary the arcuate distance therebetween. Preferably, the holes 52 have a uniform spacing from one another, and hole 52' has a longer spacing from an end hole 52. Peg 54 is usually fixed in hole 52' and peg 56 is placed and held in one of the holes 52 to selectively vary the arcuate spacing between pegs 54,56.

A lever arm 58 is rotatably attached to shaft 46 by pin 60, which extends through hole 62 above lever arm 58 on shaft 46. The lever arm 58 is disposed adjacent actuating plate 48 so that the actuating plate 48 is sandwiched between lever arm 58 and valve body 42. Lever arm 58 is rotatable about the rectangular end of shaft 46 through circular hole 64 between one position in which lever arm 58 engages peg 54 and another position in which lever arm 58 engages peg 56.

Lever arm 58 affects rotational movement of shaft 46 and disc 44 only when lever arm 58 is moved while in engagement with one of pegs 54,56, and when lever arm 58 rotates between and out of engagement with pegs 54,56, there is no rotational motion of shaft 46 or valve disc 44 and, consequently, the flow through the valves does not change.

The degree of adjustment of the valve arrangement depends directly upon where in the particular rotational movement of lever arm 58 one of pegs 54,56 is engaged, i.e., the point of actuation. The degree of adjustment also depends upon the extent of the particular rotational movement that lever arm 58 undergoes. Thus, in general, the degree of adjustment of the valve arrangement of the present invention is varied by: (1) varying the spacing between the pegs 54,56 to thereby determine the point at which the lever arm 58 engages a peg, and (2) varying the degree of arcuate movement of the lever arm 58 after it engages one of the pegs 54,56.

In the preferred embodiment of the present invention as illustrated in FIG. 1, four valve arrangements 34,36,38,40 are interlinked together by a linking assembly that comprises a linking rod 66 pivotally attached to each lever arm 58 of each valve arrangement. A hole 68 is provided in each lever arm 58 that is aligned with holes in linking rod 66 so that each lever arm 58 can be pivotably attached to linking rod 66 using a nut and bolt assembly 70. A manually operated handle 72 is provided as a rigid extension of the lever arm 58 of valve arrangement 36, and is pivotably connected at an intermediate point to linking rod 66 to simultaneously adjust selected valve assemblies, thereby simultaneously adjusting the rate of fluid flow therethrough, as explained in greater detail below.

In operation, the handle 72 illustrated in FIG. 1 is pivoted in a downward or counterclockwise direction to move linking rod 66 in a generally downward direction which causes lever arm 58 of each valve arrangement 34,36,38,40 to rotate downward. At certain points in the displacement of the handle 72 and linking rod 66, each lever arm 58 of each valve arrangement engages and moves in engagement with one of pegs 54,56, depending upon the positioning of such peg 54,56 in each individual valve arrangement. In moving while in engagement with one of the pegs 54,56, lever arm 58 of each valve arrangement controls the adjustment of each valve by rotating each respective shaft 46 and disc 44. The flow through the selected valve arrangements are thereby simultaneously adjusted. In this preferred embodiment, there preferably is no need to vary adjustments of the valve arrangements relative to one another and, therefore, all valve arrangements are selected to adjust in unison.

In a typical sand filtration system of the type illustrated in FIG. 1, there are two cycles: a filter cycle and a backwash cycle. In the filter cycle, valve 34 is opened to allow pool water to enter the filtration tank 12 through conduit 14. The water is forced through the filter medium 20, then out of the tank 12 through the lateral underdrain system 22, and returned to the pool through conduit 28 and open valve 40. During this cycle, valves 36 and 38 are closed.

In the backwash cycle, the filtration system is cleansed by forcing water into the bottom of the tank 12 via the lateral underdrain system 22, forcing it up through the filter medium 20 (preferably sand), causing it to expand, thereby affecting scrubbing action, and forcing the water out of the top header 18 and through conduits 14 and 32 to a disposal system with dirt particles that are flushed from the filter medium 20. The flow of the pool water is diverted to the underdrain system 22 during the backwash cycle by closing valve 40 and opening valve 36, and the flow of the water from the tank 12 is diverted to the disposal system by opening valve 38 and closing valve 34.

Thus, valves arrangements 34,36,38,40 control the cycles of the filtration system: the filter cycle is performed when valve arrangements 34,40 are open and valve arrangements 36,38 are closed; and the backwash cycle is performed when valve arrangements 36,38 are open and valve arrangements 34,40 are closed. In the preferred embodiment, pegs 54,56, of each of the valves 34,36,38,40 are positioned so that valves 34,40 are open and valves 36,38 are closed when handle 72 is in an upright position as shown in FIG. 1, and valves 34,40 are closed and valves 36,38 are opened when handle 72 is pivoted downwardly to a lower position (not shown).

In the aforesaid valve linkage, the degree of adjustment of each independent valve arrangement still depends upon: (1) varying the positioning of the pegs to thereby vary the point at which the lever arm engages a peg; and (2) varying the extent of the arcuate movement of the lever arm. However, the interlinked valve arrangements of the present invention includes another dimension of adjustability not found in a single valve arrangement and results from the interlinking of the valve arrangements—each valve arrangement can be selectively actuated at varying predetermined points in a particular displacement of the lever arm. Thus, each valve arrangement can be simultaneously adjusted with other valve arrangements that have been selectively actuated, while non-selected valve arrangements will not be adjusted. In other words, the actuating members on each actuating plate of all valve arrangements can be positioned relative to one another in a particular sequence so that certain valve arrangements are actuated and adjust before other valve arrangements. Hence, in a particular displacement, varying degrees of adjustment of the valve arrangements can be achieved while nevertheless still adjusting all valve arrangements in the displacement. Furthermore, the rate of adjustment of selected valve arrangements depends directly upon the accelerated movement of the handle, which can be varied. Valve arrangements in which the rate of adjustment is of concern can be selected in a particular displacement prior to other valve arrangements and an appropriate change in the adjustment rate can be controlled by controlling the acceleration of the handle.

The present invention thus has the advantageous result that all four valves can be controlled simultaneously by operation of a single handle, whereas conventionally the valves are manually operated one-at-a-time. It is also contemplated, in addition, that the linking assembly can be moved via mechanical means as disclosed, for example, in FIGS. 5–7, in which a hydraulic cylinder is employed rather than a handle. In any event, there is a single moving means responsible for selected actuation and adjustment of all selected valve arrangements.

Furthermore, it will be readily apparent to one skilled in the art that the valve arrangements of the present invention may be used in a linking assembly having valve arrangements that comprise a valve disc, valve shaft, and lever arm fixedly attached to the shaft and pivotably attached to the linking means, but that do not have selective actuating means. These valve arrangements, when joined with the valve arrangements of the present invention by linking means, are in effect continuously actuated so that movement by the linking means corresponds to adjustment of these valve arrangements. In other words, this valve arrangement which lacks actuating means for selected actuation corresponds to the valve arrangement of the present invention when the actuating members are selectively positioned to be in constant engagement with the lever arm.

Figure 5:
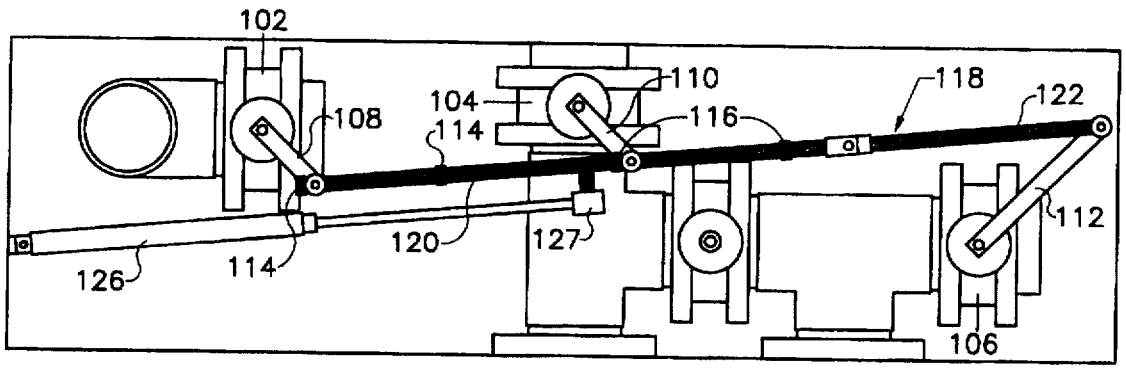
FIG. 5 illustrates another preferred embodiment of the present invention wherein a hydraulic cylinder attached to the linking assembly is in one position.
Figure 6:
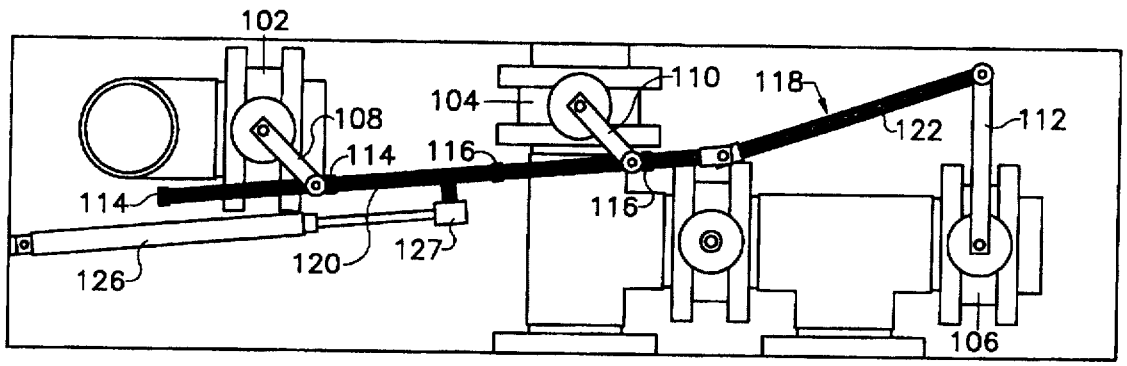
FIG. 6 illustrates the hydraulic cylinder of FIG. 5 in an intermediate position.
Figure 7:
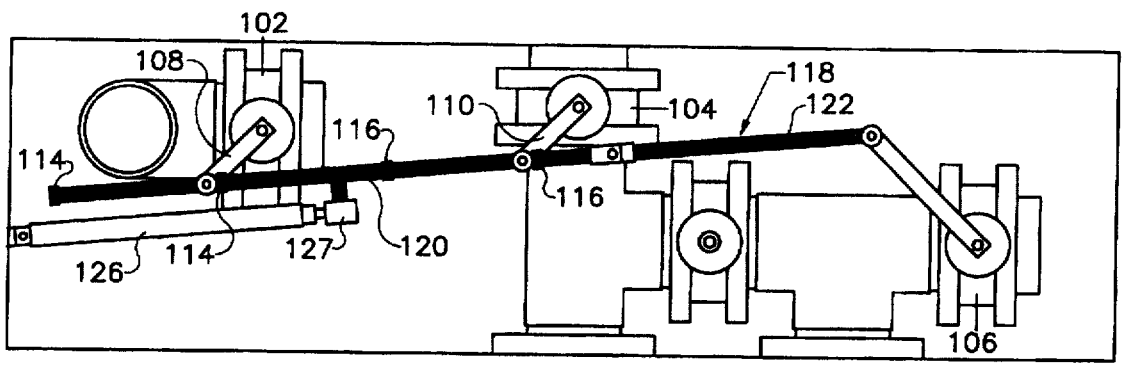
FIG. 7 illustrates the hydraulic cylinder of FIG. 5 in a second position.

Thus, it should be readily apparent that in the valve linkage illustrated in FIG. 1, only those valve arrangements in which selected actuation and adjustment is desired or required need be the valve arrangements of the present invention. Furthermore, the valve linkage of a second preferred embodiment as illustrated in FIGS. 5–7 and more fully explained below, can similarly utilize the valve arrangement of the present invention in conjunction with valve arrangements lacking selective actuating means. For an example, in the valve linkage illustrated in FIG. 1, if the water disposal system in not capable of receiving full flow from the filter tank during a backwashing cycle, valve arrangement 38 would be selectively actuatable and adjustable, and valve arrangements 34,36,40 would not need to be the valve arrangements of the present invention. The actuating members of valve arrangement 38 would be set so that when handle 72 is displaced downwardly, valve arrangements 34,40 directly correspond to the motion of the handle in moving from a fully opened condition to a closed condition, and valve arrangement 36 directly corresponds to the motion of the handle 72 in moving from a fully closed condition to a fully opened condition, but valve arrangement 38 delays in adjusting due to delayed actuation so that valve arrangement 38 changes from a fully closed condition only to a partially opened condition.

Another example is the use of the valve arrangement of the present invention with a valve arrangement lacking selective actuating means illustrated in FIGS. 5–7, which also illustrates the second preferred embodiment of a valve linkage of the present invention.

Referring now to FIGS. 5–7, valve arrangements 102, 104, 106 are located in the conduits and each valve arrangement includes a valve disc, a valve shaft, and a lever arm identical to those described above in connection with FIGS. 1–4, except that each lever arm 108,110,112 is fixedly attached to the valve shaft and rotatable therewith. As illustrated, valve arrangements 102,104 include actuators having two pair of actuating members 114,116 that are selectively positionable on a linking assembly 118 to vary the spacing between the respective pairs of actuators 114, 116 for a purpose to be explained in greater detail below. Valve arrangement 106 lacks actuating means in the illustrated embodiment; however, as previously discussed, valve arrangement 106 alternatively could be structurally identical with valve arrangements 102,104, wherein the associated actuating members of valve arrangement 106 would be positioned to be in constant engagement with the lever arm of valve arrangement 106 for constant actuation and adjustment. The linking assembly 118, in turn, is both pivotably and slidably attached to lever arms 108,110 of valve arrangements 102,104, but it is only pivotably attached to lever arm 112 of valve arrangement 106. Furthermore, as explained in detail below, the linking assembly 118 is divided into two rods 120,122, with each part pivotably connected to one another, and with lever arms 108,110 attached to rod 120 and lever arm 112 attached to rod 122. Selected movement of linking assembly 118 is caused by a mechanical device, namely a pneumatic or hydraulic cylinder 126 or the like, that is pivotably attached to the linking assembly by conventional mounting means 127.

The positioning of the actuating member 114,116 on the linking assembly 118 directly affects the extent of adjustment, as well as the extent of simultaneous adjustment, of valve arrangements 102,104, respectively, with valve arrangement 106, which adjusts whenever linking assembly 118 moves. Furthermore, the length of lever arms 108, 110 also affects the extent of adjustment of each respective valve. Finally, the extent of adjustment of all valves is dependent upon the extent of movement of the linking assembly 118. In the preferred embodiment, each actuating member of each pair 114,116 is spaced eight and one-half inches from one another on the linking assembly 118. Furthermore, lever arms 108,110 are preferably six inches in length and lever arm 112 is preferably one foot long, with the hydraulic cylinder 126 preferably having a throw of seventeen inches.

In operation, the preferred embodiment illustrated in FIGS. 5–7 allows valve arrangements 102,104,106 to be independently selected for actuation and adjustment at different points in the movement of the linking assembly 118, and allows each valve to undergo a complete change in operating condition, i.e., from an open/closed condition to a closed/open condition. Referring to FIG. 5, valves 102,104 are in the closed condition and valve 106 is in the open condition. As the hydraulic cylinder 126 begins to retract, the linking assembly 118 moves from a first position illustrated in FIG. 5 to an intermediate position illustrated in FIG. 6 and causes lever arm 112 to rotate and adjust the position of the valve of valve arrangement 106. When eight and one-half inches of the linking assembly 118 has slid by lever arms 108,110, one of the actuating members of pair 114 and of pair 116 engage lever arms 108,110, respectively, whereupon valve arrangement 102,104 are selectively actuated. Further movement of eight and one-half inches by the linking assembly 118 from the intermediate position illustrated in FIG. 6 to the second position illustrated in FIG. 7 results in movement of lever arm 112 and lever arms 108, 110 for simultaneous adjustment of all valve arrangements 102,104,106. However, because lever arms 108,110 are one-half the length of lever arms 112, valve arrangement 106 goes from a partially opened condition to a closed condition and valve arrangements 102,104 go from a closed condition to an opened condition. Reverse motion of the linking assembly 118 by the full expansion of hydraulic cylinder 126 results in valve arrangement 106 returning to a partially open condition from a closed condition first, and then valve arrangements 102,104 changing from a open to a closed condition and valve arrangement 106 simultaneously changing from a half open to a fully opened condition.

In conclusion, the present invention provides a unique arrangement by which movement of the linking means by a single moving means, e.g., by manual movement of a single handle, or by mechanical movement of a hydraulic or pneumatic cylinder or the like, can be used to simultaneously operate all of the valves in a system such as a sand filtration system used with a swimming pool. Moreover, the present invention also allows each individual valve to be separately and individually adjusted to control the flow of water therethrough depending on the particular demands of a specific system. Thus the present invention is capable of efficiently meeting all flow demands in any conduit system.

It will therefore be readily understood by those persons skilled in the art that the present invention is susceptible of a broad utility and application. Many embodiments and adaptations of the present invention other than those herein described will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A valve linkage system for simultaneously adjusting flow rates in two or more fluid conduits, comprising:
   (a) a valve arrangement in each conduit wherein at least one said valve arrangement is independently actuated, all of said valve arrangements each including a valve in each respective conduit for adjusting the flow rate of fluid therethrough and a controller attached to said valve for controlling actuation and adjustment of said valve, said at least one independently actuated valve arrangement further including
   actuating means associated with said valve for adjustable selected actuation of said valve, said actuating means including two actuating members and said controller thereof being disposed between and engageable with said actuating members for controlling said selected actuation and adjustment of said valve, said controller actuating and adjusting said valve when moving while in engagement with one of said actuating members, and
   (b) a linkage interconnecting all said controllers of all said valve arrangements to adjust flow rates therethrough, said linkage further arranged to cause said engagement between said actuating members and said controller for said selected actuation of each said independently actuated valve arrangement when said linkage is moved, thereby simultaneously adjusting each said actuated valve.

2. A valve linkage system according to claim 1, further including means connected to said linkage for moving said linkage, said moving means comprising a manually operated handle pivotably mounted to said linkage.

3. A valve linkage system according to claim 2, wherein said handle is a rigid extension of one of said controllers of said valve arrangements.

4. A valve linkage system according to claim 2, wherein there are four valve arrangements and said moving means is displaceable between one position, in which a first and a fourth valve arrangement is open and a second and a third valve arrangement is closed, and another position, in which said first and said fourth valve arrangements are closed and said second and said third valve arrangements are open.

5. A valve linkage system according to claim 2, wherein there are at least two valve arrangements and said moving means is displaceable from one position, in which a first valve arrangement is open and a second valve arrangement is closed, through an intermediate position in which said first valve arrangement is partially opened and said second valve arrangement is closed, to another position in which said first valve arrangement is closed and said second valve arrangement is opened.

6. A valve linkage system according to claim 1, further including means connected to said linkage for moving said linkage, said moving means comprising a mechanically operated device pivotably mounted to said linkage.

7. A valve linkage system according to claim 6, wherein there are four valve arrangements and said moving means is displaceable between one position, in which a first and a fourth valve arrangement is open and a second and a third valve arrangement is closed, and another position, in which said first and said fourth valve arrangements are closed and said second and said third valve arrangements are open.

8. A valve linkage system according to claim 6, wherein there are at least two valve arrangements and said moving means is displaceable from one position, in which a first valve arrangement is open and a second valve arrangement is closed, through an intermediate position in which said first valve arrangement is partially opened and said second valve arrangement is closed, to another position in which said first valve arrangement is closed and said second valve arrangement is opened.

9. A valve linkage system according to claim 1, wherein each said actuating means of each said selectively actuated valve arrangement includes an actuating plate, said actuating members being selectively placeable on said actuating plate to vary the distance therebetween to vary said selected actuation.

10. A valve linkage system according to claim 1, wherein said actuating members are disposed on and move with said linkage, said linkage being slidably and pivotably connected to said controller of each said selectively actuated valve arrangement.

11. A valve linkage system according to claim 10, wherein said actuating members can be selectively positioned on said linkage to vary said selected actuation of each said selectively actuated valve arrangement.

12. A valve linkage system according to claim 10, wherein at least two said controllers of said valve arrangements comprise lever arms of different lengths and said linkage includes two linking rods pivotably joined, at least one of said linking rods being slidably and pivotably connected to one of said valve arrangements having said differing length lever arms.

13. A valve linkage system according to claim 1, wherein:
   each said valve of each said selectively actuated valve arrangement comprises a valve disc disposed in the respective conduit and rotatable between one position in which the flow in the conduit is blocked and another position in which the flow in the conduit is open, and all positions therebetween in which the flow is partially blocked to varying degrees, and a valve shaft attached to said disc and extending therefrom outside of the conduit, said shaft being rotatable to rotate said disc between said first and second positions and to all intermediate positions therebetween,
   each said actuating means of each said selectively actuated valve arrangement comprises an actuating plate attached to said shaft for said selective actuation of said valve, said actuating plate being attached to said shaft and having two adjustable actuating members that are selectively disposable on said actuating plate to vary the arcuate distance therebetween thereby varying said selected actuation,
   each said controller of each said selectively actuated valve arrangement comprises a lever arm rotatably attached to said shaft adjacent said actuating plate, said lever arm being further rotatable about said shaft between one position in which said lever arm engages a first of said actuating members and another position in which said lever arm engages a second of said actuating members, said lever arm affecting rotational motion of said shaft and said disc when said lever arm is moved in engagement with one of said actuating members, and
   said linkage comprises a linking assembly pivotally attached to each said valve arrangement.

14. A valve linkage system according to claim 1, wherein said linkage is attached to said controller of said at least one selectively actuated valve arrangement for sliding with respect thereto, said two actuating members thereof being disposed on said linkage a selected adjustable distance apart so that said controller is disposed therebetween, said controller being fixedly attached to said valve for rotational movement therewith, each said actuating member being slidably engageable with said controller so that said controller adjusts said valve when said controller moves while in engagement with one of said actuating members and no adjustment of said valve occurs when said controller moves while out of engagement with said actuating members.

15. A valve linkage system according to claim 1, wherein:

said actuating means is attached to said valve for selected actuation of said valve, said controller is attached to said valve adjacent said actuating means, said controller being movable between said two actuating members and engageable with said actuating members for controlling said selected actuation and adjustment of said valve, and said controller adjusts said valve when said controller moves while in engagement with one of said actuating members, and no adjustment of said valve occurs when said controller moves while out of engagement with said actuating members.

16. A valve linkage system according to claim 15, wherein said actuating means includes an actuating plate, and said actuating members are selectively placeable on said actuating plate to vary the distance therebetween that said controller travels in engaging said actuating members, thereby varying said selected actuation and adjustment of said valve by said actuating means.

17. A valve arrangement according to claim 15, wherein said valve includes a valve disc disposed in the conduit and rotatable between one position in which the flow in the conduit is blocked and another position in which the flow in the conduit is open, and all positions therebetween in which the flow is partially blocked to varying degrees, and a valve shaft attached to said disc and extending therefrom outside of the conduit, said shaft being rotatable to rotate said disc between said one and said another positions and to all intermediate positions therebetween, said actuating means includes an actuating plate attached to said shaft, said two actuating members being selectively placeable on said actuating plate to vary the arcuate distance therebetween for varying said selective actuation of said valve arrangement by said controller, and said controller comprises a lever arm rotatably attached to said shaft adjacent said actuating plate, said lever arm being further rotatable about said shaft between one position in which said lever arm selectively engages a first of said actuating members and another position in which said lever arm selectively engages a second of said actuating members, said lever arm affecting rotational motion of said shaft and said disc when said lever arm is moved while in engagement with one of said actuating members.

18. A valve linkage system according to claim 1 for use in a swimming pool filtration system that has a filtration and a backwash cycle, further comprising:

(c) a filtration tank for filtering the pool water, (d) a first conduit and a second conduit connected to said filtration tank, said first conduit carry water to said filtration tank during the filtration cycle and said second conduit carrying water to said filtration tank during the backwash cycle, (e) a third conduit interconnecting said first conduit and said second conduit, (f) a fourth conduit for carrying water to the filtration system, said fourth conduit communicating with and intersecting said third conduit between its connection with said first and said second conduits, (g) a fifth and a sixth conduit for removing fluid from the filtration system, with said fifth conduit intersecting said third conduit where said third conduit intersects said second conduit, and said sixth conduit intersecting said third conduit where said third conduit intersects said first conduit, (h) four valve arrangements for adjusting the flow rates of water therethrough, with a first valve arrangement disposed between said intersections of said first and sixth conduits and said third and fourth conduits, a second valve arrangement disposed between said intersections of said second and third conduits and said third and fourth conduits, a third valve arrangement disposed within said fifth conduit, and a fourth valve arrangement disposed within said sixth conduit, and (i) means connected to said linkage for moving said linkage between first and second positions to individually actuate said valve arrangements and simultaneously adjust actuated arrangements thereby simultaneously adjusting the flow rates therethrough, (j) wherein when said moving means moves between said first position and said second position, said first valve arrangement changes from an open position to a closed position, said second valve arrangement changes from a closed position to an open position, said third valve arrangement changes from an open position to a closed position, and said fourth valve arrangement changes from a closed position to an open position, thereby causing water flow in the filtration system to change from flow through said first conduit into said filter tank for filtration to backflow through said second conduit into said filter tank for the cleaning thereof.

19. A valve linkage system comprising:

at least one valve arrangement including a valve for adjusting flow rate of fluid therethrough, a controller attached to said valve for controlling actuation and adjustment of said valve, and actuating means for adjustable selected actuation of said valve, said controller being engageable with said actuating means for controlling said selected actuation and adjustment of said valve;

at least one other valve arrangement, said other valve arrangement including a valve for adjusting flow rate of fluid therethrough and a controller attached to said valve for controlling actuation and adjustment of said valve; and a linkage interconnecting all said controllers of all said valve arrangements to adjust flow rates therethrough.

20. A valve linkage system comprising:

at least one independently actuated valve arrangement and at least one other valve arrangement, both said valve arrangements each including a valve for adjusting flow rate of fluid therethrough and a controller attached to said valve for controlling actuation and adjustment of said valve; and a linkage interconnecting all said controllers of all said valve arrangements to adjust flow rates therethrough, said linkage including at least one actuating member selectively engageable with said controller of said independently actuated valve arrangement during movement of said linkage for adjustable selected actuation thereof independent of other said valve arrangements.

* * * * *